US012657969B2

(12) United States Patent
B Venkataraman et al.

(10) Patent No.: US 12,657,969 B2
(45) Date of Patent: Jun. 16, 2026

(54) CRITICAL SCENARIO IDENTIFICATION FOR VERIFICATION AND VALIDATION OF VEHICLES

(71) Applicant: Siemens Industry Software NV, Leuven (BE)

(72) Inventors: Saadhana B Venkataraman, Chennai (IN); Vijaya Sarathi Indla, Bangalore (IN); Bony Mathew, Perumbavoor (IN); Saikat Mukherjee, Bangalore (IN); Ram Padhy, Ganjam (IN); Sagar Pathrudkar, Pune (IN); Bristi Singh, Bangalore (IN)

(73) Assignee: Siemens Industry Software NV, Leuven (BE)

( * ) Notice: Subject to any disclaimer, the term of this patent is extended or adjusted under 35 U.S.C. 154(b) by 164 days.

(21) Appl. No.: 18/023,413

(22) PCT Filed: Aug. 28, 2020

(86) PCT No.: PCT/EP2020/074101

§ 371 (c)(1),
(2) Date: Feb. 27, 2023

(87) PCT Pub. No.: WO2022/042853

PCT Pub. Date: Mar. 3, 2022

(65) Prior Publication Data

US 2024/0013592 A1 Jan. 11, 2024

(51) Int. Cl.

*G07C 5/08* (2006.01)
*G08G 1/01* (2006.01)

(52) U.S. Cl.

CPC ......... *G07C 5/0808* (2013.01); *G08G 1/0112* (2013.01)

(58) Field of Classification Search

CPC .............. G07C 5/00; G08G 1/00; H04W 4/00
See application file for complete search history.

(56) References Cited

U.S. PATENT DOCUMENTS 10,636,295 B1 4/2020 Kim et al.
11,577,741 B1 * 2/2023 Reschka ............. B60W 50/045
(Continued)

FOREIGN PATENT DOCUMENTS

CN 108428343 A 8/2018
CN 111209790 A 5/2020
(Continued)

OTHER PUBLICATIONS

International Serach Report and Written Opinion for International Application PCT/EP2020/074101 mailed Apr. 29, 2021.

*Primary Examiner* — Aniss Chad
*Assistant Examiner* — Elizabeth J Slowik
(74) *Attorney, Agent, or Firm* — Lempia Summerfield Katz LLC

(57) ABSTRACT

A scenario identification system and a computer implemented method for identifying one or more critical scenarios from vehicle data associated with one or more vehicles are provided. The scenario identification system obtains at least the inertial measurement unit (IMU) data from the vehicle data, derives one or more IMU-based driving parameters from the IMU data, and analyzes the IMU-based driving parameters based on one or more predefined thresholds for identifying the critical scenario(s).

9 Claims, 4 Drawing Sheets

(56) References Cited

U.S. PATENT DOCUMENTS

| | | | | |
|---|---|---|---|---|
| 2017/0108612 | A1* | 4/2017 | Aguib | G01V 7/16 |
| 2018/0165960 | A1* | 6/2018 | Seo | G06V 20/586 |
| 2019/0065933 | A1 | 2/2019 | Bogdoll et al. | |
| 2019/0271614 | A1 | 9/2019 | Ahner et al. | |
| 2020/0143843 | A1* | 5/2020 | Luo | G06V 20/52 |
| 2020/0160070 | A1 | 5/2020 | Sholingar et al. | |
| 2021/0063974 | A1* | 3/2021 | Okawa | G06N 5/01 |
| 2021/0094540 | A1* | 4/2021 | Bagschik | G06V 20/58 |
| 2021/0190258 | A1* | 6/2021 | Nancollis | F16M 11/10 |
| 2021/0364305 | A1* | 11/2021 | Rizk | G01C 21/3605 |
| 2021/0389769 | A1* | 12/2021 | Hari | G05B 13/027 |
| 2022/0068052 | A1* | 3/2022 | Maeta | G07C 5/0808 |

FOREIGN PATENT DOCUMENTS

| | | | |
|---|---|---|---|
| GB | 2560096 | A | 8/2018 |
| JP | 2019182399 | A | 10/2019 |
| JP | 2020015493 | A | 1/2020 |
| JP | 2020123351 | A | 8/2020 |

* cited by examiner

CRITICAL SCENARIO IDENTIFICATION FOR VERIFICATION AND VALIDATION OF VEHICLES

CROSS REFERENCE TO RELATED APPLICATIONS

This present patent document is a § 371 nationalization of PCT Application Serial Number PCT/EP2020/074101, filed Aug. 28, 2020, designating the United States, which is hereby incorporated in its entirety by reference.

FIELD

Embodiments provide a system and computer implemented method for enhancing safety of autonomous and semi-autonomous vehicles and for identification of critical scenarios associated therewith.

BACKGROUND

Conventional industry approaches employed in evaluation of safety of an Autonomous Vehicle (AV) include miles driven simulation approach. A simulator simulates a virtual world through which the AV is driven for a large number miles to develop enough statistical data, disengagements approach wherein a human intervention in the operation of the AV is considered due to an unsafe decision that was about to be made by the AV which could have led to an accident, and a scenario based testing and proprietary approach. For a scenario based verification, various possible driving scenarios are simulated, and the AV is exposed to these scenarios to evaluate a confidence level associated with the driving decisions that the AV makes. The challenge with scenario based approach is the amount of data including the real-time vehicle data as well as simulated vehicle data that has to be pruned in order to build scenarios that would be of importance.

Identifying critical scenarios, such as corner cases or edge cases from huge amounts of real-time and simulated vehicle data is a tedious process. The data may consist of raw inputs as well as processed data from multiple sensors, such as cameras, LIDARs, RADARs, IMUs, GPS sensors, etc. Also, the data may range from a few hours to a few days. Hence, the amount of data to be processed is humungous. The process of identifying the critical scenarios from huge amount of vehicle data is traditionally solved by searching through the whole dataset and finding out the scenarios where the safety metrics are violated. There exist various criticality testing methodologies that define such violations, for example, Responsibility-Sensitive Safety (RSS) developed by Mobileye® B.V. Corporation Netherlands, Nvidia Safety Force Field® (SFF) developed by Nvidia Corporation Delaware, and/or typical massive scenario testing involving cutting edge model in the loop or software in the loop testing all of which provide the safety metrics for identifying critical scenarios. However, aforementioned testing methodologies require using brute-force or linear search algorithms for pruning through huge amount of vehicle data to identify violations thereby, rendering them to be non-viable and/or non-feasible options.

BRIEF SUMMARY AND DESCRIPTION

The scope of the embodiments is defined solely by the appended claims and is not affected to any degree by the statements within this summary. The present embodiments may obviate one or more of the drawbacks or limitations in the related art.

Embodiments provide a system and a computer implemented method that identify critical scenarios in an efficient and effective manner to ensure safety and reliability of navigation of autonomous and/or semi-autonomous vehicles.

Disclosed herein is a scenario identification system for identifying critical scenario(s) from vehicle data associated with the vehicle(s). As used herein, "critical scenario" refers to an undesirable event associated with the vehicle(s) that may potentially lead to an accident or physical damage to the vehicle(s). A critical scenario includes, for example, a collision between vehicles, a collision against an object, a potential collision with a vehicle and/or an object, an unexpected vehicle failure, etc.

The vehicle(s) refer to at least one autonomous vehicle that is a vehicle including multiple sensors mounted thereon. The sensors include, for example, high precision cameras, laser radars (LiDARs and LADARs), millimeter wave radars, positioning sensors, illuminating sensors, Global Positioning System (GPS) sensors, Inertial Measurement Unit (IMU) sensors, ambient condition monitoring sensors, etc. The sensors may capture data in physical values such as voltage, current, positional co-ordinates, particulate matter concentration, wind speed, pressure, humidity, etc., and/or in form of media such as images and/or videos captured by the camera. The vehicle(s) also refer to one or more target vehicles in proximity of a primary vehicle and capable of affecting the primary vehicle's driving at one point or another. The target vehicle(s) may or may not have aforementioned sensors mounted thereon.

According to one aspect of the present disclosure, the scenario identification system is deployable in a cloud computing environment. As used herein, "cloud computing environment" refers to a processing environment including configurable computing physical and logical resources, for example, networks, servers, storage, applications, services, etc., and data distributed over a communication network, for example, the internet. The cloud computing environment provides on-demand network access to a shared pool of the configurable computing physical and logical resources.

According to another aspect of the present disclosure, the scenario identification system is deployable as an edge device mounted on a primary vehicle.

According to yet another aspect of the present disclosure, the scenario identification system is deployable as a combination of a cloud-based system and an edge device wherein some modules of the scenario identification system are deployable on the primary vehicle and remaining modules are deployable in the cloud-computing environment.

The scenario identification system includes a non-transitory computer readable storage medium storing computer program instructions defined by modules of the scenario identification system. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal.

The scenario identification system includes at least one processor communicatively coupled to the non-transitory computer readable storage medium. The processor executes the computer program instructions. As used herein, the term "processor" refers to any one or more microprocessors, microcontrollers, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions.

The scenario identification system includes a data reception module, a data processing module, a data analysis module, a scenario management module, a graphical user interface (GUI), and/or a scenario management database.

The data reception module receives the vehicle data associated with the vehicle(s). The data reception module operably communicates with the vehicle(s) and one or more traffic modeling device(s) for receiving the vehicle data. As used herein, "vehicle data" includes data recorded by the sensors mounted on the vehicle(s) including the primary vehicle and the target vehicles, and data recorded by one or more other-road users and/or objects such as pedestrians in proximity of the primary vehicle. The vehicle data includes data that may impact driving of the primary vehicle. Advantageously, the vehicle data may span over several hours, for example, a day-to-day basis or may be corresponding to each trip made. According to one aspect the data reception module receives the vehicle data from a local storage such as a database or a memory module disposed along with the sensors on the vehicle(s). Also, used herein "traffic modeling device" refers to a traffic simulator engine, for example, SimCenter® PreScan that is a simulation platform used for automotive industry developed by Siemens Industry Software N.V. Corporation Belgium.

The data processing module obtains a predefined type of data from the vehicle data. The predefined type of data includes at least inertial measurement unit (IMU) data. The IMU data for the primary vehicle is typically directly recorded from the IMU sensor mounted on the primary vehicle. Advantageously, the IMU data is pure text data available in a structured format including, for example, a time stamp of a time instance at which the data is recorded, an angular velocity at the time instance and a linear acceleration at the time instance. Advantageously, the IMU data may also include an angular rate, a specific force, and a magnetic field associated with the vehicle(s). The predefined type of data may also include Global Positioning System (GPS) data in addition to the IMU data. For example, the GPS data may be required, for example, when there is a need to derive linear velocity of the primary vehicle.

According to one aspect of the present disclosure, the data processing module obtains the predefined type of data for the target vehicles in aforementioned manner when there are sensors, for example, IMU sensors and/or GPS sensors mounted thereon.

According to another aspect of the present disclosure, the data processing module obtains the predefined type of data for the target vehicles by employing one or more multi-object tracking algorithms when there are no sensors mounted thereon and therefore, no IMU data and/or GPS data is recorded. Advantageously, the multi-object tracking algorithms use the vehicle data received from the primary vehicle and perform sensor fusion to compute an accurate position of each target vehicle. These positions, also referred to as states, are then converted to the global coordinate system using the GPS data of the primary vehicle at that corresponding time instance. From the positions of the target vehicle over a period of time, the linear velocity and acceleration information of the target vehicles is derived, and mapped with corresponding timestamps thereby, creating IMU data for the target vehicles.

The data processing module derives one or more IMU-based driving parameters from the predefined type of data. The IMU-based driving parameters may be user defined. The IMU-based driving parameters include, for example, an acceleration of a vehicle, a velocity of the vehicle, and a trajectory of the vehicle. The vehicle being the primary vehicle and/or the target vehicle. According to one aspect of the present disclosure, the data processing module derives secondary parameters using the acceleration, the velocity and/or the trajectory values. For example, time to collision of the primary vehicle with one or more target vehicles is a secondary parameter derived from relative velocity between the primary vehicle and the target vehicle. Advantageously, the data processing module upon deriving these IMU-based driving parameters and associated secondary parameters, if any, stores them into the scenario management database in a time-stamped manner. This data may be used in future for learning and performance enhancement purposes by the scenario identification system.

The data analysis module analyzes the IMU-based driving parameter(s) based on one or more predefined thresholds for identifying the critical scenario(s). The thresholds are defined corresponding to each of the IMU-based driving parameters. The thresholds may be user-defined or defined by the data analysis module based on historical data stored in the scenario management database.

According to one example, when a lateral acceleration of a primary vehicle is greater than 2.5 meters/sec2 and a lateral deceleration of the primary vehicle is greater than 2.9 meters/sec2, the condition is termed as critical. The thresholds defined here for lateral acceleration and lateral deceleration represent sudden change in velocity of a primary vehicle. However, it may be appreciated by one skilled in the art, that such thresholds may greatly vary based on a type, a make, a condition, of the primary vehicle. Similarly, a threshold may be defined for acceleration which is a derived value from the velocity change over a period of time.

According to another example, consider a primary vehicle such as a mid-sized car moving at a constant velocity of 80 kilometers/hour on a highway and the velocity suddenly drops to 30 kilometers/hour in a duration of merely 10 seconds. A linear deceleration of the primary vehicle then becomes about 5 meters/second2, which is way higher than the threshold of 2.9 meters/second2. This essentially means that the car has applied sudden brakes and therefore, the scenario may be potentially a critical scenario.

According to yet another example, a sudden change in trajectory of a primary vehicle may be obtained from the GPS data over a period of time. If required, lane change information may also be obtained using vehicle data recorded by other sensors, such as camera(s) and LiDAR(s). Such a scenario would typically be of cut-in or cut-out involving sudden variation in lateral distance between the primary vehicle and the target vehicle(s). When, the lateral distance is less than 0.5 m, the scenario may be termed as a potential critical scenario.

According to yet another example, thresholds may be defined for secondary parameters derived from the IMU-based driving parameters. When time to collision between a primary vehicle and target vehicle(s) is less than or equal to 1.5 seconds, the scenario may be termed as a potential critical scenario.

The scenario management module generates traffic scenario(s) using the vehicle data corresponding to the IMU-based driving parameters and/or the secondary parameters, exceeding the predefined thresholds. The scenario management module generates the traffic scenario termed to be potentially critical by the data analysis module, using corresponding time instance data of the sensors such as camera(s), LiDAR(s), etc. The scenario management module validates the traffic scenario(s) for criticality. Advantageously, for generation and validation of the traffic scenarios, a traffic modeling device, for example, SimCenter® PreScan may be used. The validation may be performed based on one or more criticality testing standards including but not limited to Responsibility-sensitive safety (RSS), Nvidia Safety Force Field® (SFF), and/or typical massive scenario testing.

Advantageously, the scenario management database provides for storing of the vehicle data, the IMU data, the GPS data, the IMU-based driving parameters, the secondary parameters derived therefrom, the predefined thresholds corresponding to each of the IMU-based driving parameters and/or the secondary parameters, and/or the traffic scenario(s) generated and validated. Advantageously, the traffic scenarios are stored along with a criticality index associated therewith. For example, a potential collision may have a higher criticality index compared to hitting a curb when safety parameter associated with the criticality is considered. In another example, a pedestrian collision may have a higher criticality index compared to a vehicle failure when a software/firmware update for an enhanced detection of pedestrians or objects is being verified and validated for the primary vehicle. Therefore, based on a context in which the verification and validation is to be conducted on the primary vehicle, the criticality index Also, disclosed herein is a computer implemented method for identifying one or more critical scenarios from vehicle data associated with one or more vehicles. Advantageously, the computer implemented method employs the aforementioned scenario identification system including at least one processor configured to execute computer program instructions for performing the method. The computer implemented method includes receiving, by the data reception module, vehicle data associated with one or more of the vehicles, obtaining, by the data processing module, a predefined type of data from the vehicle data, wherein the predefined type of data includes at least inertial measurement unit (IMU) data, deriving, by the data processing module, one or more IMU-based driving parameters including at least an acceleration, a velocity, and a trajectory of a vehicle, from the predefined type of data, and analyzing, by the data analysis module the IMU-based driving parameter(s) based on one or more predefined thresholds for identifying the critical scenario(s). The computer implemented method further includes generating, by the scenario management module one or more traffic scenario(s) using the vehicle data corresponding to the IMU-based driving parameters exceeding the predefined thresholds, and validating, by the scenario management module, the traffic scenario(s) for criticality.

Also, disclosed herein is a computer program product including a non-transitory computer readable storage medium storing computer program codes that include instructions executable by at least one processor, and including a first computer program code for obtaining a predefined type of data from the vehicle data. The predefined type of data includes at least inertial measurement unit (IMU) data. The computer program product includes a second computer program code for deriving one or more IMU-based driving parameters from the predefined type of data and a third computer program code for analyzing the one or more IMU-based driving parameters based on one or more predefined thresholds for identifying the one or more critical scenarios. The computer program further includes a fourth computer program code for generating one or more traffic scenarios using the vehicle data corresponding to the IMU-based driving parameters exceeding the predefined thresholds and a fifth computer program code for validating the one or more traffic scenarios for criticality. According to one aspect of the present disclosure, a single piece of computer program code including computer executable instructions performs one or more steps of the computer implemented method disclosed herein for identifying critical scenarios.

Also, disclosed herein is a traffic modeling device including a computer with a simulation software, the simulation software applying the computer implemented method for identifying critical scenarios, based on at least the IMU data associated with one or more vehicles.

The scenario identification system, the computer implemented method, the computer program product and the traffic modeling device disclosed above enable optimized processing of the vehicle data by deriving a subset of data therefrom pertaining at least to the IMU data for identifying and validating critical scenarios thereby, saving on processing infrastructure, bandwidth, time, and cost without compromising on accuracy critical scenario identification.

The above summary is merely intended to give a short overview over some features of some embodiments and implementations and is not to be construed as limiting. Other embodiments may include other features than the ones explained above.

BRIEF DESCRIPTION OF THE DRAWINGS

The above and other elements, features, steps and characteristics of the present disclosure will be more apparent from the following detailed description of embodiments with reference to the following figures.

DETAILED DESCRIPTION

Figure 1A:
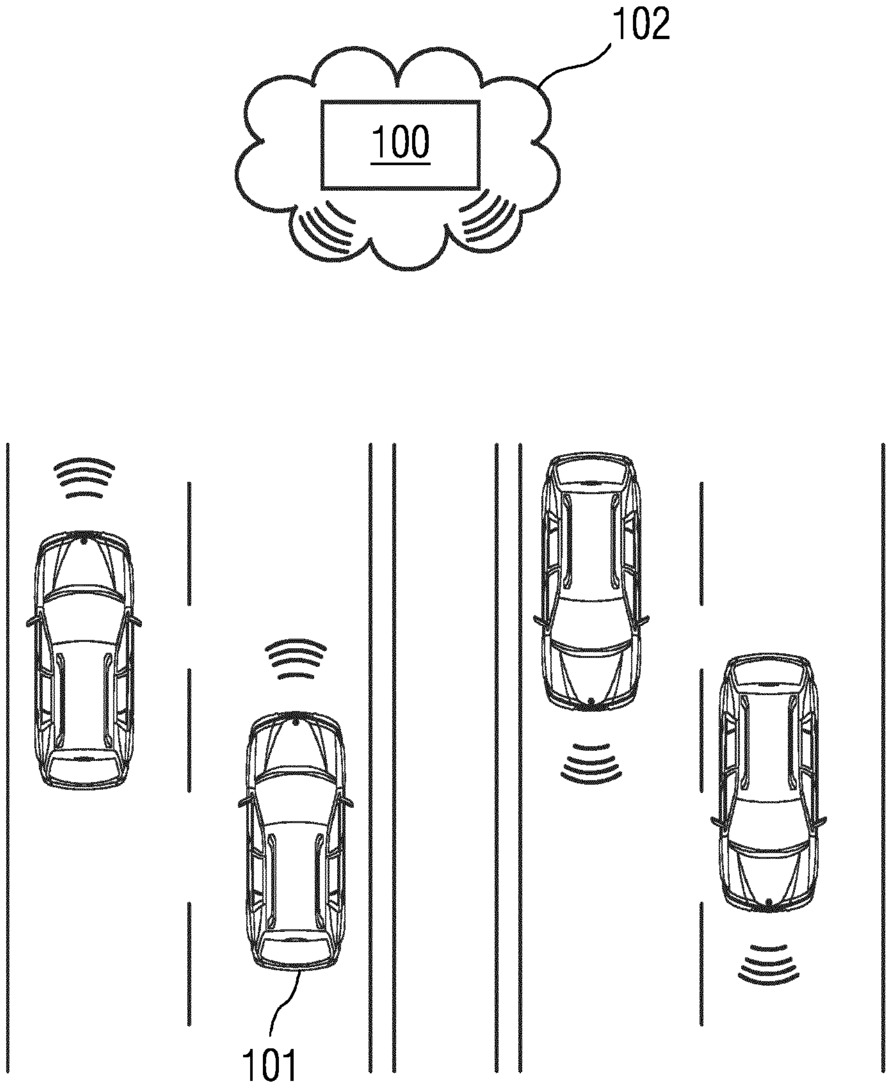
FIGS. 1A-1B depict schematic representations of a scenario identification system for vehicle(s), according to an embodiment.

In the following, embodiments of the disclosure will be described in detail with reference to the accompanying drawings. It is to be understood that the following description of embodiments is not to be taken in a limiting sense.

The drawings are to be regarded as being schematic representations and elements illustrated in the drawings, which are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Figure 1B:
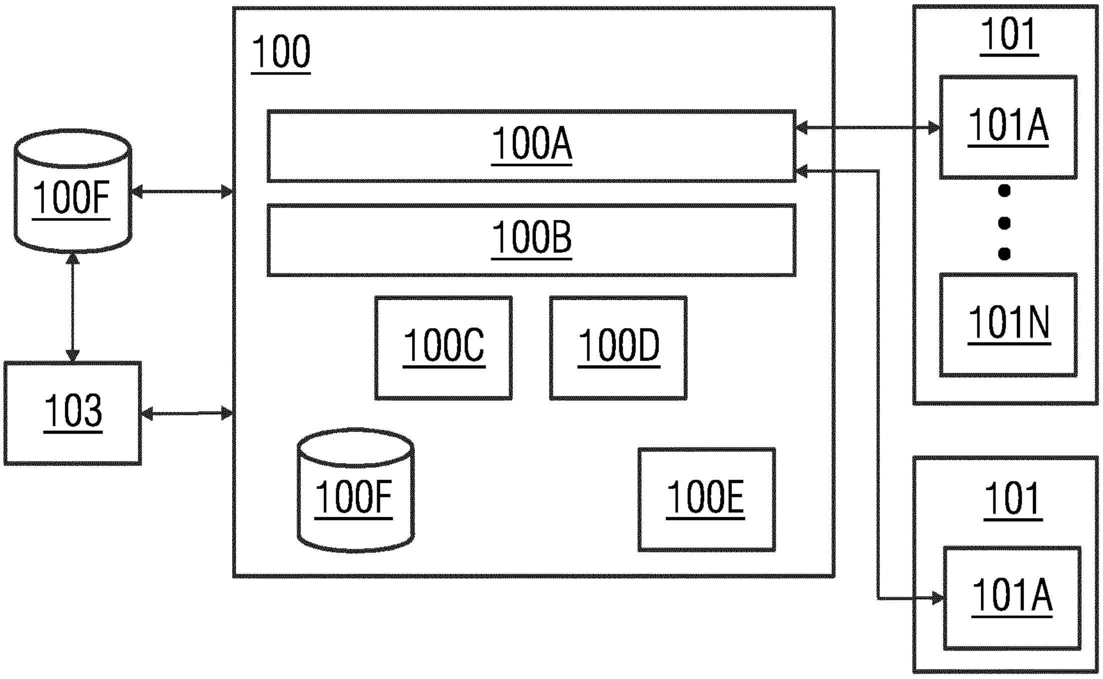

FIGS. 1A-1B depict schematic representations of a scenario identification system 100 for vehicle(s), according to an embodiment. FIG. 1A depicts the scenario identification system 100 capable of communicating with one or more vehicles 101 and residing in a cloud 102. The cloud 102 depicts a cloud computing environment referring to a processing environment including configurable computing physical and logical resources, for example, networks, servers, storage, applications, services, etc., and data distributed over the network, for example, the internet. The cloud computing environment provides on-demand network access to a shared pool of the configurable computing physical and logical resources. The scenario identification system 100 is developed, for example, using the Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc. The scenario identification system 100 may also be configured as a cloud computing-based platform implemented as a service for identifying critical scenarios associated with the vehicle(s) 101. The vehicle(s) 101 include autonomous and/or semi-autonomous vehicle(s) being monitored, managed, and/or controlled also referred to herein as a primary vehicle 101. The vehicle(s) 101 also include one or more vehicles referred to herein as target vehicles 101 that are in proximity of the primary vehicle and which may or may not be autonomous.

FIG. 1B depicts different modules 100A-100F of the scenario identification system 100 in communication with the vehicle(s) 101. A primary vehicle 101 typically has various sensors 101A-101N mounted thereon. The sensors 101A-101N include Radio Detection and ranging (RADAR) sensors, laser detection and ranging (LADAR) sensors, Light Detection and Ranging (LiDAR) sensors, camera(s), Inertial Measurement Unit (IMU) sensors, and/or Global Positioning System (GPS) sensors. A target vehicle 101 may have some of the sensors 101A-101N listed above such as a GPS sensor.

The scenario identification system 100 includes a data reception module 100A, a data processing module 100B, a data analysis module 100C, a scenario management module 100D, a graphical user interface (GUI) 100E, and/or a scenario management database 100F. The scenario management database 100F may also reside outside the scenario identification system 100 either inside or outside of the cloud 102 shown in FIG. 1A. The scenario identification system 100 is capable of communicating with one or more traffic modeling devices 103, for example, a traffic simulator engine such as SimCenter® PreScan a simulation platform used for automotive industry developed by Siemens Industry Software N.V. Corporation Belgium.

The scenario identification system 100 includes a non-transitory computer readable storage medium, for example, the scenario management database 100F, and at least one processor (not shown) communicatively coupled to the non-transitory computer readable storage medium referring to various computer readable media, for example, non-volatile media such as optical discs or magnetic disks, volatile media such as a register memory, a processor cache, etc., and transmission media such as wires that constitute a system bus coupled to the processor, except for a transitory, propagating signal. The non-transitory computer readable storage medium is configured to store computer program instructions defined by modules 100A-100E, of the scenario identification system 100. The processor is configured to execute the defined computer program instructions.

Figure 2:
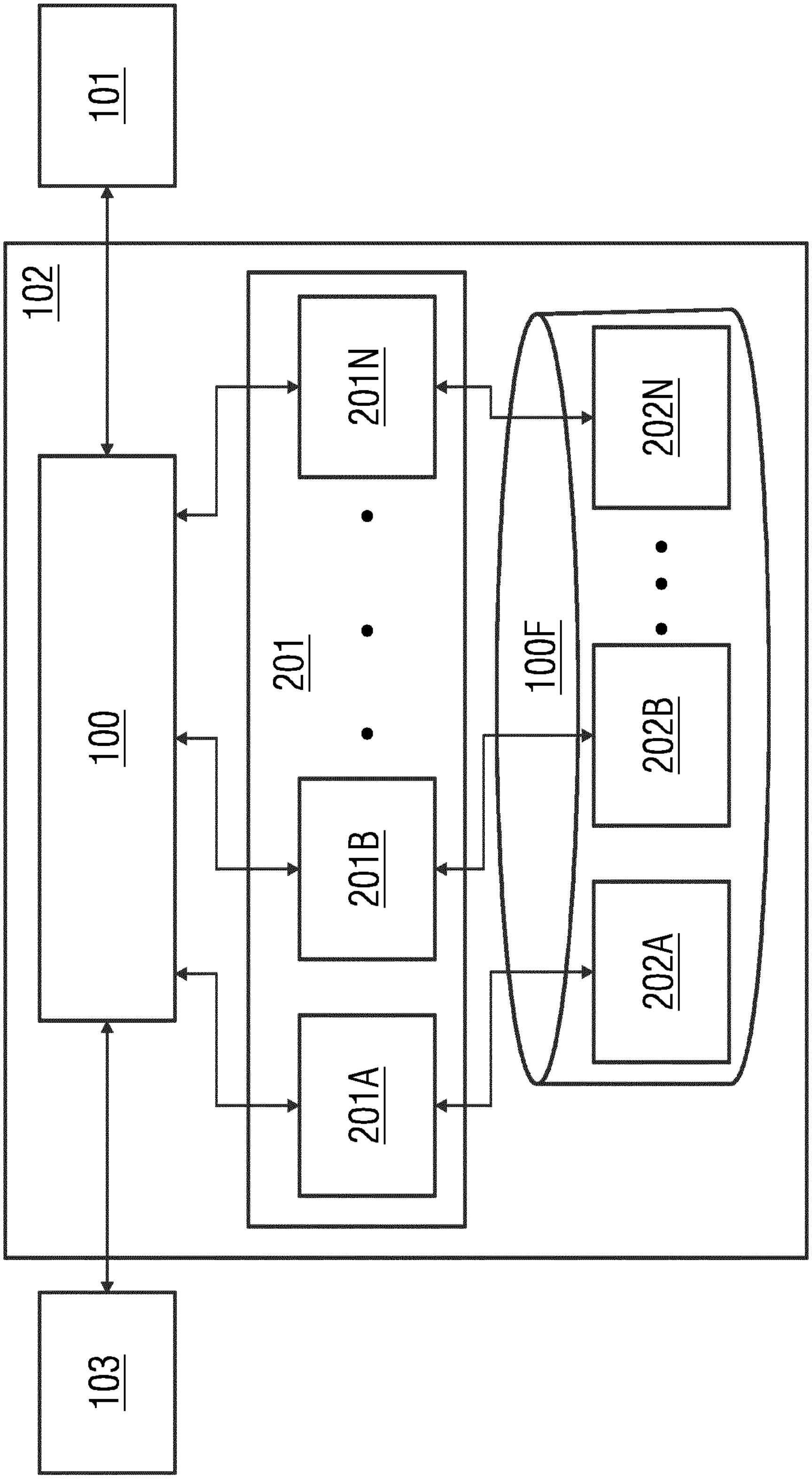
FIG. 2 is a schematic representation of components of a cloud-computing environment in which the scenario identification system shown in FIGS. 1A-1B is deployed, according to an embodiment.

FIG. 2 is a schematic representation of components of a cloud-computing environment 102 in which the scenario identification system 100 shown in FIGS. 1A-1B is deployed, according to an embodiment of present disclosure. The scenario identification system 100 residing in the cloud 102 employs an application programming interface (API) 201. The API 201 employs functions 201A-201N each of which enable the scenario identification system 100 to transmit and/or receive data stored in the scenario management database 100F, one or more traffic modeling devices 103, and the vehicles 101, shown in FIG. 1A and FIG. 1B. The scenario management database 100F includes data models 202A-202N which store data received from the vehicles 101, the scenario identification system 100, and/or traffic modeling device(s) 103. It may be noted that each of the data models 202A-202N may store data in a compartmentalized manner pertaining to a particular vehicle 101, a particular scenario that the vehicle 101 may be facing or may have faced, etc. Also, each of the functions 201A-201N is configured to access one or more data models 202A-202N in the scenario management database 100F. The scenario identification system 100 works autonomously. However, there may be a provision that provides for a user of the scenario identification system 100 to secure access via an interactive graphical user interface (GUI) 100E of the scenario identification system 100 to configure and operate the scenario identification system 100. The data reception module 100A shown in FIG. 1B of the scenario identification system 100 receives vehicle data from the vehicle(s) 101 and transforms the input into an API call. The data processing module 100B of the scenario identification system 100 forwards this API call to the API 201 which in turn invokes one or more appropriate API functions 201A-201N responsible for retrieving/storing the vehicle data into the scenario management database 100F. Then, the API 201 determines one or more data models 202A-202N within the scenario management database 100F for performing said operation of retrieval/storage of vehicle data. The API 201 returns the retrieved data, or an acknowledgement of data stored into the scenario management database 100F which in turn may be forwarded to the user, via the GUI 100E. The data that the user may want to retrieve may include, for example, reports of scenarios identified, analytics on vehicle data, etc.

It may be appreciated that aforementioned communication exchange happening between the modules 100A-100F of the scenario identification system 100, the vehicle(s) 101 and the traffic modeling device(s) 103 involve allowing for a speedy yet secure communication there-between. This may include usage of protocols supported by V2X communication including but not limited to Transmission Control Protocol (TCP), Internet Protocol (IP), User Datagram Protocol (UDP), OPC Unified Architecture (OPC-UA) Protocol, etc., and usage of networks involving wireless networks such as 4G, LTE or 5G that meet desired requirements and are compliant with the standards laid down for traffic management such as IEEE 802.11.

Figure 3:
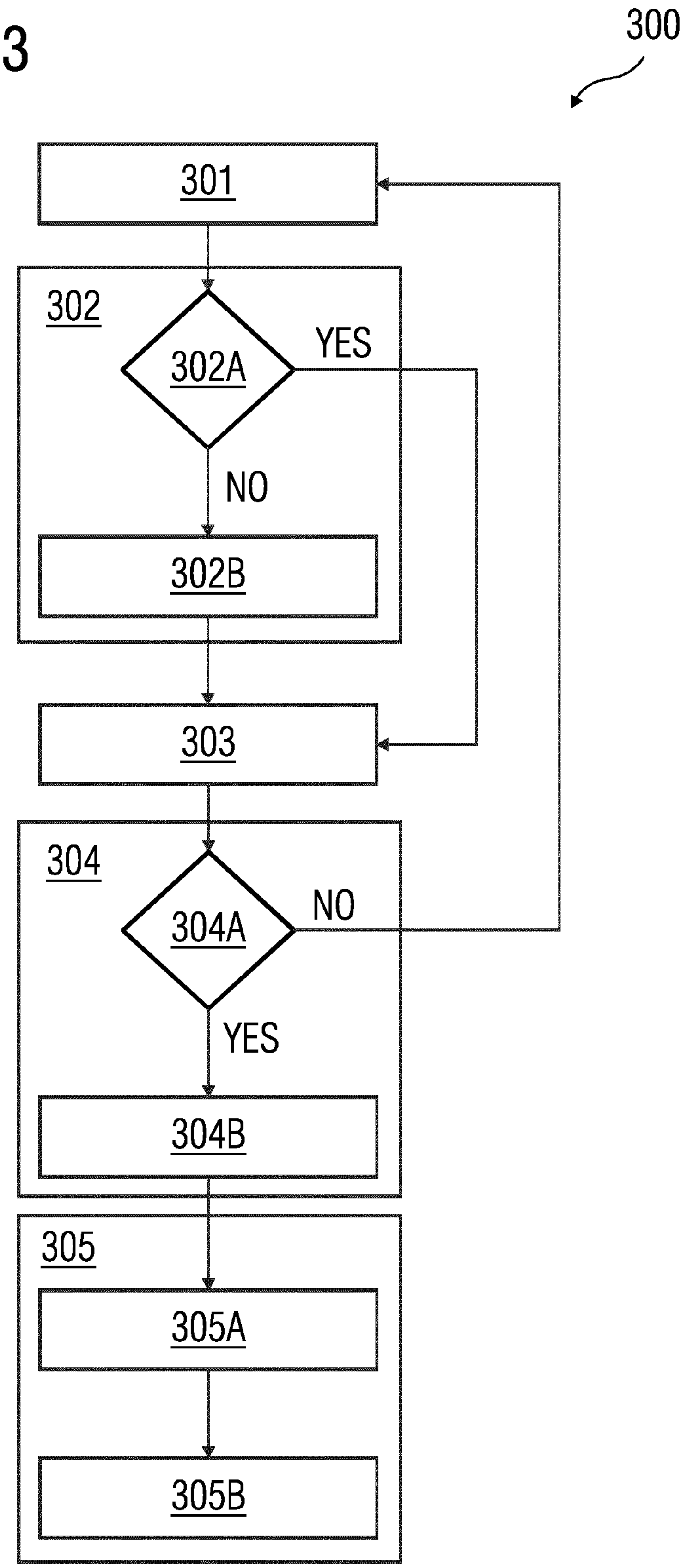
FIG. 3 a process flowchart representing a computer implemented method for identifying a critical scenario for vehicle (s), according to an embodiment.

FIG. 3 depicts a process flowchart representing a computer implemented method 300 for identifying a critical scenario for vehicle(s) 101, according to an embodiment. The method 300 disclosed herein employs the scenario identification system 100 including at least one processor configured to execute computer program instructions for identifying a critical scenario for vehicle(s) 101, depicted in FIGS. 1A-1B.

At step 301, data reception module 100A of the scenario identification system 100 receives vehicle data from multiple sensors 101A-101N mounted on the primary vehicle 101 and/or target vehicles 101. The data reception module 100A establishes a secure connection with each of the vehicles 101 to receive the vehicle data. The data reception module 100A also authenticates each vehicle 101 prior to receiving the vehicle data. The data reception module 100A receives the vehicle data recorded by the sensors 101A-101N over several hours, for example, a day.

At step 302, a data processing module 100B of the scenario identification system 100 obtains a predefined type of data from the vehicle data. The predefined type of data is inertial measurement unit (IMU) data. The IMU data includes force, angular measurements and magnetic field pertaining to the vehicle 101. At step 302A, the data processing module 100B checks whether the IMU data is present in the vehicle data received for the primary vehicle 101 as well as the target vehicle(s) 101. This is possible when an IMU sensor is mounted on the vehicle(s) 101. If not, then at step 302B the data processing module 100B computes the IMU data based on the vehicle data recorded by the sensors 101A-101N mounted on the target vehicles 101. The data processing module 100B employs one or more multi-object tracking algorithms on the data available for the target vehicle(s), that is, the vehicle(s) that do not have IMU data readily available, to compute the IMU data. A first stage of multi-object tracking is detection of the sensor data that is, the vehicle data. On detection, the raw measurements are translated to meaningful features, that is objects are located through detection and segmentation. After this the located objects are fed to one or more filters. A state of each object in the surrounding is represented using random variable concept having a probability assigned to each variable. According to the probability, the state of the system is derived which then is used to derive information related to force, angular measurements and magnetic field of the vehicles 101. If at step 302A, the data processing module 100B finds the IMU data to be present in the vehicle data, then the method 300 progresses to step 303.

At step 303, the data processing module 100B extracts one or more IMU-based driving parameters from the predefined type of data. The IMU-based driving parameters are acceleration, velocity and trajectory of the primary vehicle 101 and the target vehicle(s) 101. These IMU-based driving parameters are derived from the IMU data. There may be secondary parameters derived from the acceleration, velocity and/or trajectory, for example, time to collision which is relative velocity between two or more vehicle(s) 101.

At step 304, the data analysis module 100C of the scenario identification system 100 analyses each of the parameter(s) based on predefined threshold(s) corresponding to the parameter(s). At step 304A, the data analysis module 100C checks whether the acceleration, the velocity and/or the trajectory of the primary vehicle 101 are within the respective predefined thresholds. The thresholds are defined based on sudden changes such as braking, orientation, etc., for example, rapid deceleration or sudden change in orientation. A sudden deceleration or trajectory change may occur when a pedestrian or another vehicle appears in front of a moving primary vehicle 101 without sufficient prior intimation and the primary vehicle 101 has to apply brakes or make a sudden turn to avert an accident. This may also occur in case of cut-in and cut-out maneuvers during driving when the primary vehicle's 101 acceleration will have a sudden drop in response to applying the brakes to avert an accident as a result of another vehicle cutting-in and cutting-out without sufficient prior intimation. The time instances where this sudden change in IMU data with respect to acceleration, velocity and/or trajectory is found to be present, are critical instances and may be searched though the IMU text data in a time-effective manner.

The data analysis module 100C, at step 304B stores in the scenario management database 100F, such time instances where the acceleration, velocity and/or trajectory data of the primary vehicle 101 shows a sudden change, and therefore exceeds the corresponding threshold(s), as a critical conditions. If none of the thresholds are found to be exceeded at step 304A, the data analysis module 100C awaits reception of another set of vehicle data by the data reception module 100A.

At step 305, the scenario management module 100D of the scenario identification system 100 processes the conditions marked to be critical by the data analysis module 100C. The scenario management module 100D, at step 305A, generates a critical scenario based on the critical conditions stored in the scenario management database 100F by the data analysis module 100C, and corresponding time instance data recorded by various sensors 101A-101N such as the camera, LiDAR, etc. At step 305B, the scenario management module 100D validates the critical scenarios thus constructed by feeding them into traffic simulator engines for verification and validation using one or more testing methodologies that define standard traffic violations, for example, Responsibility-Sensitive Safety (RSS), Nvidia Safety Force Field® (SFF), and/or typical massive scenario testing.

Where databases are described such as the scenario management database 100F, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries may be different from those disclosed herein. Further, despite any depiction of the databases as tables, other formats including relational databases, object-based models, and/or distributed databases may be used to store and manipulate the data types disclosed herein. Likewise, object methods or behaviors of a database may be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present disclosure may be configured to work in a network environment including one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices includes processors, some examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, some examples of which are disclosed above. While the operating system may differ depending on the type of computer, the operating system will continue to provide the appropriate communications protocols to establish communication links with the network. Any number and type of machines may be in communication with the computers.

The present disclosure is not limited to a particular computer system platform, processor, operating system, or network. One or more aspects of the present disclosure may be distributed among one or more computer systems, for example, servers configured to provide one or more services to one or more client computers, or to perform a complete task in a distributed system. For example, one or more aspects of the present disclosure may be performed on a client-server system that includes components distributed among one or more server systems that perform multiple functions according to various embodiments. These components include, for example, executable, intermediate, or interpreted code, which communicate over a network using a communication protocol. The present disclosure is not limited to be executable on any particular system or group of systems, and is not limited to any particular distributed architecture, network, or communication protocol.

The foregoing examples have been provided merely for the purpose of explanation and are in no way to be construed as limiting of the present disclosure disclosed herein. While the disclosure has been described with reference to various embodiments, it is understood that the words, which have been used herein, are words of description and illustration, rather than words of limitation. Further, although the disclosure has been described herein with reference to particular means, materials, and embodiments, the disclosure is not intended to be limited to the particulars disclosed herein; rather, the disclosure extends to all functionally equivalent structures, methods and uses, such as are within the scope of the appended claims. Those skilled in the art, having the benefit of the teachings of this specification, may affect numerous modifications thereto and changes may be made without departing from the scope of the disclosure in its aspects.

It is to be understood that the elements and features recited in the appended claims may be combined in different ways to produce new claims that likewise fall within the scope of the present embodiments. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present embodiments have been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer implemented method for identifying one or more critical scenarios from vehicle data associated with one or more vehicles, the computer implemented method, the method comprising:

obtaining a predefined type of data from the vehicle data recorded by physical IMU sensors mounted on the one or more vehicles, wherein the predefined type of data comprises at least inertial measurement unit (IMU) data, wherein the IMU data is purely searchable text data available in a structured format including timestamps of time instances at which the IMU data was recorded, angular velocity at the time instances, and linear acceleration at the time instances, wherein the structured and searchable format enables automated detection of threshold exceedances used by a data analysis module to identify the one or more critical scenarios;

deriving one or more IMU-based driving parameters from the predefined type of data;

analyzing the one or more IMU-based driving parameters based on one or more predefined thresholds for identifying the one or more critical scenarios;

generating, by a scenario management module of a scenario identification system, one or more traffic scenarios using the vehicle data corresponding to the IMU-based driving parameters exceeding the predefined thresholds;

validating, by the scenario management module, the one or more traffic scenarios for criticality; and providing the one or more validated traffic scenarios, including associated criticality indices, to a traffic modeling device or vehicle-control verification system for use in verifying, validating, or updating one or more autonomous-vehicle behavior policies that control operation of a vehicle.

2. The computer implemented method of claim 1, wherein the IMU-based driving parameters comprise one or more of an acceleration of the vehicle, a velocity of the vehicle, or a trajectory of the vehicle.

3. The computer implemented method of claim 1, wherein obtaining the predefined type of data from the vehicle data comprises performing one of:

selecting the IMU data from the vehicle data; or computing the IMU data based on the vehicle data.

4. A scenario identification system for identifying one or more critical scenarios from vehicle data associated with one or more vehicles, the scenario identification system comprising:

a non-transitory computer readable storage medium configured to store computer program instructions defined by modules of the scenario identification system;

at least one processor communicatively coupled to the non-transitory computer readable storage medium, the at least one processor configured to execute the defined computer program instructions;

a data reception module configured to operably communicate with the one or more vehicles to receive the vehicle data recorded by physical IMU sensors mounted on the one or more vehicles;

a data processing module configured to:

obtain a predefined type of data from the vehicle data, wherein the predefined type of data comprises at least inertial measurement unit (IMU) data, wherein the IMU data is purely searchable text data available in a structured format including timestamps of time instances at which the IMU data was recorded, angular velocity at the time instances, and linear acceleration at the time instances, wherein the structured and searchable format enables automated detection of threshold exceedances used by a data analysis module to identify the one or more critical scenarios; and derive IMU-based driving parameters from the predefined type of data, the IMU-based driving parameters comprising at least acceleration, velocity, and trajectory;

the data analysis module configured to analyze the IMU-based driving parameters based on one or more predefined thresholds for identifying the one or more critical scenarios;

a scenario management module configured to:

generate one or more traffic scenarios using the vehicle data corresponding to the one or more IMU-based driving parameters exceeding the one or more predefined thresholds;

validate the one or more traffic scenarios for criticality;

provide the one or more validated traffic scenarios, including associated criticality indices, to a traffic modeling device or vehicle-control verification system for use in verifying, validating, or updating one or more autonomous-vehicle behavior policies that control operation of a vehicle; and a scenario management database configured to store the vehicle data, the IMU data, the one or more IMU-based driving parameters, the one or more predefined thresholds corresponding to each of the one or more IMU-based driving parameters, and the one or more traffic scenarios.

5. The scenario identification system of claim 4, further comprising a data reception module configured to operably communicate with the one or more vehicles and one or more traffic modeling devices for receiving the vehicle data.

6. A system comprising:

a primary vehicle comprising one or more physical sensors configured to acquire vehicle data related to the primary vehicle;

a scenario identification system for identifying one or more critical scenarios from the vehicle data associated with the primary vehicle, the scenario identification system comprising:

a non-transitory computer readable storage medium configured to store computer program instructions defined by modules of the scenario identification system;

at least one processor communicatively coupled to the non-transitory computer readable storage medium, the at least one processor configured to execute the defined computer program instructions;

a data reception module configured to operably communicate with the one or more vehicles to receive the vehicle data;

a data processing module configured to:

obtain a predefined type of data from the vehicle data, wherein the predefined type of data comprises at least inertial measurement unit (IMU) data, wherein the IMU data is purely searchable text data available in a structured format including timestamps of time instances at which the IMU data was recorded, angular velocity at the time instances, and linear acceleration at the time instances, wherein the structured and searchable format enables automated detection of threshold exceedances used by a data analysis module to identify the one or more critical scenarios; and derive one or more IMU-based driving parameters from the predefined type of data;

a data analysis module configured to analyze the one or more IMU-based driving parameters based on one or more predefined thresholds for identifying the one or more critical scenarios;

a scenario management module configured to:

generate one or more traffic scenarios using the vehicle data corresponding to the one or more IMU-based driving parameters exceeding the one or more predefined thresholds;

validate the one or more traffic scenarios for criticality; and provide the one or more validated traffic scenarios, including associated criticality indices, to a traffic modeling device or vehicle-control verification system for use in verifying, validating, or updating one or more autonomous-vehicle behavior policies that control operation of a vehicle; and a scenario management database configured to store the vehicle data, the IMU data, the one or more IMU-based driving parameters, the one or more predefined thresholds corresponding to each of the one or more IMU-based driving parameters, and the one or more traffic scenarios.

7. The system of claim 6, wherein the data processing module is configured to:

translate the vehicle data to one or more features comprising objects that are located through detection and segmentation;

inputting the located objects to one or more filters; and deriving a state of each object in the surrounding using a random variable concept having a probability assigned to each variable;

wherein the state is used to derive information related to force, angular measurements and magnetic field.

8. The system of claim 6, wherein the one or more sensors comprise at least a LIDAR system.

9. The system of claim 6, wherein the predefined thresholds comprise where when a lateral acceleration of the primary vehicle is greater than 2.5 meters/sec2 or when the lateral deceleration of the primary vehicle is greater than 2.9 meters/sec2.

* * * * *